US009345023B2

(12) United States Patent
Gayde et al.

(10) Patent No.: US 9,345,023 B2
(45) Date of Patent: May 17, 2016

(54) METHOD AND APPARATUS FOR DETERMINATION OF ALMOST BLANK SUBFRAME PATTERN BY NETWORK LISTENING

(71) Applicant: Alcatel-Lucent USA Inc., Murray Hill, NJ (US)

(72) Inventors: Ruth S. Gayde, Naperville, IL (US); Phillip C. Sapiano, Corsham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 215 days.

(21) Appl. No.: 13/869,446

(22) Filed: Apr. 24, 2013

(65) Prior Publication Data

US 2014/0321434 A1      Oct. 30, 2014

(51) Int. Cl.
*H04W 72/04* (2009.01)
*H04W 72/08* (2009.01)
*H04W 84/04* (2009.01)

(52) U.S. Cl.
CPC ...... *H04W 72/0426* (2013.01); *H04W 72/0413* (2013.01); *H04W 72/082* (2013.01); *H04W 84/045* (2013.01)

(58) Field of Classification Search
CPC .......... H04W 72/0426; H04W 72/413; H04W 72/082; H04W 84/045
See application file for complete search history.

(56) References Cited

U.S. PATENT DOCUMENTS

| 2012/0113850 | A1* | 5/2012 | Fu et al. | 370/252 |
| 2013/0010668 | A1* | 1/2013 | Lin et al. | 370/312 |
| 2013/0114435 | A1* | 5/2013 | Wang et al. | 370/252 |
| 2014/0198678 | A1* | 7/2014 | Kim et al. | 370/252 |
| 2014/0242960 | A1* | 8/2014 | Cai et al. | 455/418 |

FOREIGN PATENT DOCUMENTS

WO    WO-2012/108155 A1    8/2012

OTHER PUBLICATIONS

Pantech, "Methods to inform femto-specific ABS pattern," 3GPP TSG RAN WG1 Meeting #63bis, R1-110160, Dublin, Ireland, Jan. 17-21, 2011.
International Search Report and Written Opinion for International Application No. PCT/US2014/034755 mailed Sep. 15, 2014.
"ETSI TS 136 211 V8.7.0 (Jun. 2009): Technical Specification". LTE; Evolved Universal Terrestrial Radio Access (E-UTRA); Sophia Antipolis Cedex, France 2009.
"ETSI TS 136 300 V8.9.0 (Jul. 2009): Technical Specification". LTE; Evolved Universal Terrestrial Radio Access (E-UTRA) and Evolved Universal Terrestrial Radio Access Network (E-UTRAN); Sophia Antipolis Cedex, France 2009.

* cited by examiner

*Primary Examiner* — Jianye Wu
(74) *Attorney, Agent, or Firm* — Harness, Dickey & Pierce, P.L.C.

(57) ABSTRACT

A method of determining almost-blank subframe (ABS) information in a heterogeneous network (HetNet) including a macro cell and one or more small cells underlaid with respect to the macro cell, the method including obtaining, at a first base station (BS) of a first one of the one or more small cells, almost-blank subframe (ABS) information of the macro cell based on at least one of transmissions of the macro cell and transmissions of a UE attached to the first small cell.

12 Claims, 7 Drawing Sheets

METHOD AND APPARATUS FOR DETERMINATION OF ALMOST BLANK SUBFRAME PATTERN BY NETWORK LISTENING

BACKGROUND

1. Field

Example embodiments relate generally to small cells within macro cells and in particular to an apparatus and/or method for determining configuration parameters for this heterogeneous network.

2. Related Art

Heterogeneous wireless networks (HetNets) are deployments of cells with differing coverage radii within a single geographic area. A typical configuration is one where macro (e.g., large) cells provide continuous coverage over the area while pico or femto (e.g., small) cells cover local hot spots or coverage holes. When both the macro cells and small cells share the same carrier frequency, the deployment is called a co-channel or shared-carrier deployment.

For example, a HetNet may include macro cell base stations (BSs) and small cell BSs including, for example, home evolved Node Bs (HeNBs). Macro cell BSs provide wireless coverage for user equipment (UEs) within the macro cells which may cover large geographical areas, while small cell BSs may provide wireless coverage for UEs located in the small cells which may cover smaller geographical areas within the coverage area of a macro cell BS. Parameters needed to configure BSs within HetNets include patterns for an almost blank subframe (ABS). A blank subframe contains no transmission from the macro cell. An "almost blank" subframe is a subframe with reduced transmit power (e.g., reduced from a maximum transmit power) and/or a reduced activity subframe (e.g., contains less data than a fully loaded subframe).

SUMMARY

According to at least one example embodiment, a method of determining almost-blank subframe (ABS) information in a heterogeneous network (HetNet) including a macro cell and one or more small cells underlaid with respect to the macro cell includes obtaining, at a first base station (BS) of a first one of the one or more small cells, almost-blank subframe (ABS) information of the macro cell based on at least one of transmissions of the macro cell and transmissions of a UE attached to the first small cell, the obtaining ABS information based on the transmissions of the macro cell including, synchronizing the first BS with the transmissions of the macro cell, analyzing the transmissions of the macro cell based on the synchronization, and obtaining the ABS information based on the analysis, the obtaining information based on the transmissions of the UE including, receiving a macro cell information message from at least one of the UE and a second BS of a second one of the one or more small cells, the macro cell information message including the ABS information.

The HetNet may follows the long term evolution (LTE) protocol, and the BS is an evolved Node B (eNB).

The ABS information may be obtained based on the transmissions of the macro cell. The analyzing the transmissions of the macro cell based on the synchronization may include receiving a plurality of subframes from the macro cell, and determining, for each received subframe, power levels of one or more reference signal physical resource blocks PRBs of the subframe and power levels of one or more non-reference signal PRBs of the subframe.

The analyzing the transmissions of the macro cell based on the synchronization may further include performing a comparison operation based on the power levels of the one or more reference signal PRBs and the power levels of the one or more non-reference signal PRBs determined for each of the subframes, estimating, based on the comparison operation, which of the plurality of subframes are being used for transmission by the macro cell and which subframes are being blanked by the macro cell, and determining the ABS information of the macro cell based on the estimating.

The reference signal broadcasted by the macro cell may be cell-specific reference signals (CRS).

According to at least one example embodiment, a method of handling almost-blank subframe (ABS) information in a heterogeneous network (HetNet) including a macro cell a small cell underlaid with respect to the macro cell may include obtaining, at a UE attached to the macro cell, almost-blank subframe (ABS) information of the macro cell based on transmissions of the macro cell; performing, at the UE, an attachment operation to attach the UE to the small cell; and sending the ABS information from the UE to a BS of the small cell.

The HetNet may follow the long term evolution (LTE) protocol and the small cell BS is an eNB.

The obtaining ABS information based on the transmissions of the macro cell may include synchronizing the UE with the transmissions of the macro cell; analyzing the transmissions of the macro cell based on the synchronization, and; obtaining the ABS information based on the analysis.

The obtaining ABS information based on the transmissions of the macro cell may include receiving a macro cell information message from the macro cell, the macro cell information message including the ABS information.

According to at least one example embodiment, a first base station (BS) includes a processor configured to control operations for determining almost-blank subframe (ABS) information in a heterogeneous network (HetNet) including a macro cell and one or more small cells underlaid with respect to the macro cell, the first BS being a BS of a first one of the one or more small cells, the operations including, obtaining, at the first base station (BS), almost-blank subframe (ABS) information of the macro cell based on at least one of transmissions of the macro cell and transmissions of a UE attached to the first small cell, the obtaining ABS information based on the transmissions of the macro cell including, synchronizing the first BS with the transmissions of the macro cell, analyzing the transmissions of the macro cell based on the synchronization, and obtaining the ABS information based on the analysis, the obtaining information based on the transmissions of the UE including, receiving a macro cell information message from at least one of the UE and a second BS of a second one of the one or more small cells, the macro cell information message including the ABS information.

According to at least one example embodiment, a user equipment (UE) includes a processor configured to control operations for handling almost-blank subframe (ABS) information in a heterogeneous network (HetNet) including a macro cell a small cell underlaid with respect to the macro cell, the operations including, obtaining, at the UE while the UE is attached to the macro cell, almost-blank subframe (ABS) information of the macro cell based on transmissions of the macro cell, performing, at the UE, an attachment operation to attach the UE to the small cell, and sending the ABS information from the UE to a BS of the small cell.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein:

FIG. 2B is a diagram illustrating an example structure of a base station (BS).

DETAILED DESCRIPTION OF EXAMPLE EMBODIMENTS

Figure 1A:
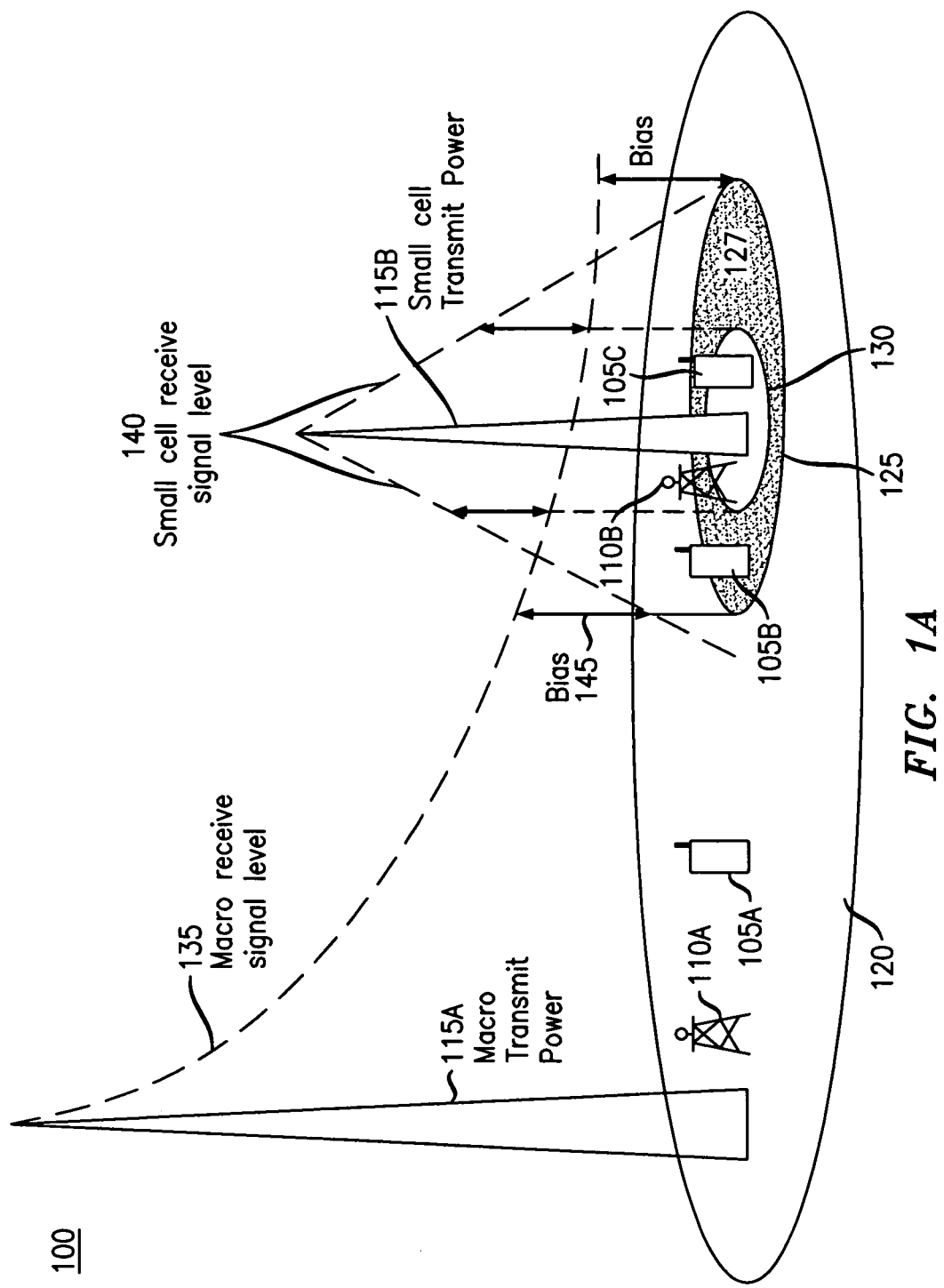
FIG. 1A is a diagram illustrating a portion of a wireless communications network according to at least some example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, access terminal, receiver, etc., and may describe a remote user of wireless resources in a wireless communication network. The term base station (BS) may be considered synonymous to and/or referred to as a base transceiver station (BTS), NodeB, evolved Node B (eNB), Home eNB (HeNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB shown in FIG. 1). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1A illustrates a portion of a wireless communications network 100. Referring to FIG. 1A, wireless communications network 100 may follow, for example, the long-term evolution (LTE) protocol. Communications network 100 includes a macro cell base station (BS) 110A; a small cell BS 110B; a macro cell 120, a small cell 125; and first through third UEs 105A-C. The small cell 125 may be, for example a pico cell or a femto cell. Further, the term 'small cell' as used herein may be considered synonymous to and/or referred to as pico cell or femto cell. The small cell 125 includes a cell range extended area (CRE) 127 and an in-cell area 130. Because wireless communications network 100 includes both macro cells and small cells, wireless network 100 may be considered a heterogeneous wireless network (HetNet).

In the example illustrated in FIG. 1A, the first UE 105A is attached to the macro cell 120, and the second and third UEs 105B and 105C are attached to the small cell 125. Further, the second UE 105B is designated as a CRE UE and the third UE 105C is designated as an in-cell UE. As will be discussed in greater detail below, the attachment of UEs to either the macro cell 120 or the small cell 125 may be controlled by a bias value 145.

Though, for the purpose of simplicity, communications network 100 is illustrated as having only macro cell BS 110A, small cell BSs 110B, and first through third UEs 105A-C, communications network 100 may have any number of macro cell BSs, small cell BSs and UEs. Further, the macro cell BS 110A and small cell BS 110B may be connected to other core network elements included in the communications network 100 including, for example, one or more mobility management entities (MME) a Home eNB Gateway a security gateway and/or one or more operations, administration and management (OAM) nodes (not shown). Further, the MME may include the OAM node.

The macro cell BS 110A may be, for example, an evolved node B (eNB) providing wireless coverage for UEs within the macro cell 120. The small cell BS 110B may be a small cell, for example, a home eNB (HeNB), underlaid with respect to the macro cell BS 110A meaning small cell BS 110B may provide wireless coverage or improved quality of service for UEs associated with the small cell 125 that supplements coverage provided by the macro cell BS 110A for UEs in the macro cell 120. Data, control signals and other information described herein as being sent and/or received by the macro cell 120 may be sent and/or received by the macro cell BS 110A. Further, operations described herein as being performed by the macro cell 120 may be performed by the macro cell BS 110A. Data, control signals and other information described herein as being sent and/or received by the small cell 120 may be sent and/or received by the small cell BS 110B. Further, operations described herein as being performed by the small cell 125 may be performed by the small cell BS 110B.

In general, a transmit power of the macro cell BS 110A may be greater than a transmit power of the small cell BS 110B. Transmit powers 115A and 115B illustrate an example of the relative transmit powers of the macro cell BS 110A and the small cell BS 110B, respectively. For example the transmit powers 115A and 115B be may be 40 W and 1 W, respectively. Macro receive signal level 135 illustrates an example of a strength of a receive signal of the macro cell 120 measured by UEs within communications network 100 as a function of the BS-UE distance. As is illustrated in FIG. 1A, in general, the strength of the macro receive signal level may drop as a distance from the UE to a location of the macro cell BS 110A increases. Small cell receive signal level 140 illustrates an example of a strength of a receive signal of the small cell 125 measured by UEs within communications network 100 as a function of the BS-UE distance. As is illustrated in FIG. 1A, in general, the strength of the small cell receive signal level 140 may drop as a distance from the UE to a location of the small cell BS 110B increases. Though, for the purpose of simplicity, macro and small cell signal levels 135 and 140 are described above and illustrated in FIG. 1A as having strengths which decrease along with an increased distance from a BS, macro and small cell signal strengths can be effected by any of a number of other factors in addition to distance including, for example, shapes and heights of buildings or physical structures within the coverage areas of macro cell 120 and small cell 125, and a number of UEs or an amount of UE traffic within a given region of the coverage area of the macro cell 120 or the small cell 125.

Explanation of Enhanced Inter Cell Interference Coordination (eICIC)

UEs in the communications network 100 that are within both a coverage area of the macro cell 120 and coverage areas of the small cell 125 may be in communication with the communications network 100 via a wireless connection to either the macro cell BS 110A or one of the small cell BS 110B. A UE in communications network 100 makes a decision with respect to which of the macro cell 120 and the small cell 125 to be associated with by comparing the macro receive signal level 135 as measured by the UE to the small cell receive signal level 140 as measured by the UE, for example, with use of the bias value 145 in accordance with known methods.

When the macro cell 120 and the small cell 125 transmit data over downlink connections to associated UEs, the transmissions of the macro cell 120 may cause interference for UEs receiving data from the small cell 125 (e.g., those like the second UE 105B). Further, the transmissions of the small cell 125 may cause interference for UEs receiving data from the macro cell 120 (e.g., those like the first UE 105A).

Accordingly, wireless communications network 100 implements the enhanced inter cell interference coordination (eICIC) scheme defined by, for example, the 3GPP Release 10 standards. In accordance with eICIC, UEs attached to the small cell 125 are divided into in-cell UEs and CRE UEs using the reference signal received power (RSRP) according to known methods.

Further, in accordance with eICIC, in order to reduce an amount of interference experienced by UEs receiving downlink transmissions, transmissions for UEs designated as CRE UEs (e.g., those like the second UE 105B in the CRE region 127) may be scheduled at a different time from transmissions for UEs designated as in-cell UEs (e.g., those like the third UE 105C within the in-cell area 130) and UEs attached to the macro cell 120 (e.g., those like the first UE 105A within the macro cell 120 and outside the small cell 125). This feature will now be discussed in greater detail below with reference to FIG. 1B.

Figure 1B:
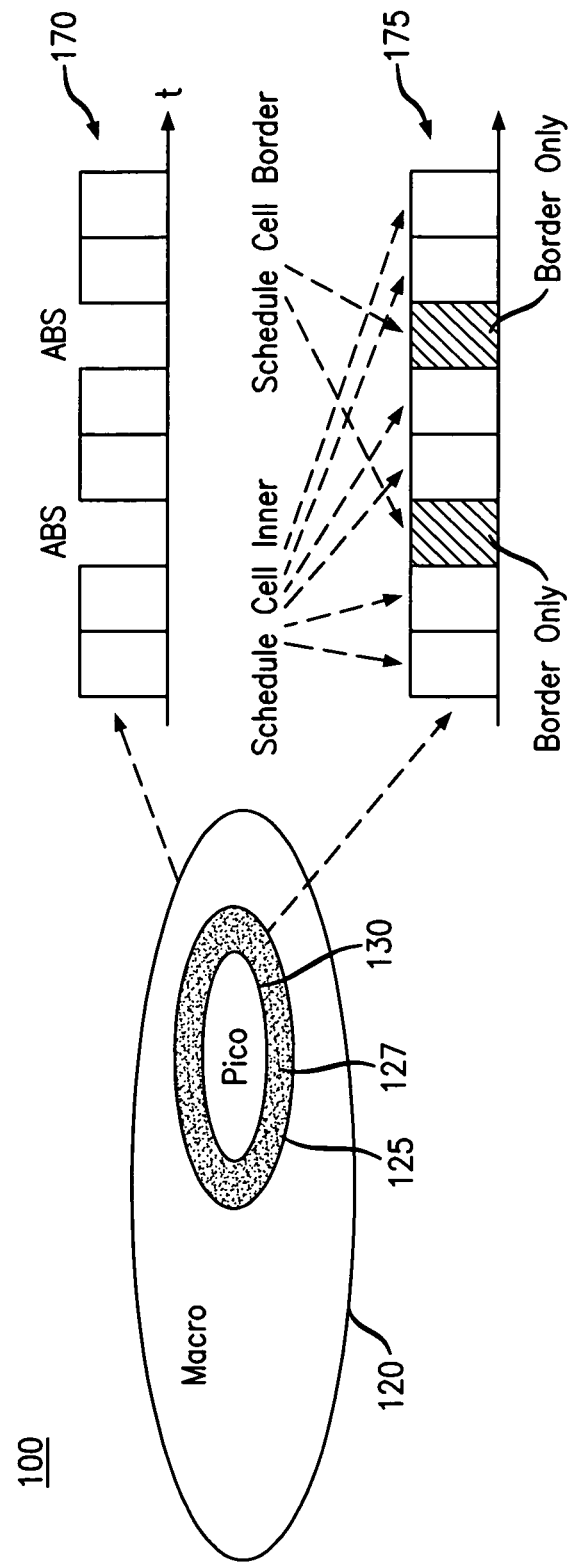
FIG. 1B is a diagram illustrating an example relationship between transmission schedules for macro and small cells.

FIG. 1B is a diagram illustrating an example relationship between transmission schedules for macro and small cells 120 and 125. Referring to FIG. 1B, first graph 170 illustrates subframes transmitted over time for the macro cell 120, and second graph 175 illustrates subframes transmitted over time for the small cell 125. As is illustrated by the first graph 170, the macro cell 120 may transmit downlink data on all frames except those designated as almost blank subframes (ABSs). As is illustrated by the second graph 175, the small cell 125 may transmit data to UEs designated as in-cell UEs on all frames except those designated as ABS frames. Accordingly, the small cell 125 may transmit data to UEs designated as in-cell UEs following the same schedule as the macro cell 120 (indicated in graph 175 as the non-shaded subframes). Further, as is illustrated by the second graph 175, the small cell 125 may transmit data to UEs designated as CRE UEs on the subframes designated by the macro cell 120 as ABS subframes (indicated in graph 175 as the shaded subframes). In the example illustrated in FIG. 1B, an ABS pattern of the transmission schedules illustrated in first and second graphs 170 and 175 is configured such that every third subframe is designated as an ABS subframe. Accordingly, in the ABS pattern illustrated in FIG. 1B, there is a 2-to-1 ratio between non-ABS subframes and ABS subframes. However, according to example embodiments, the ratio may be any ratio desired by an operator of communications network 100.

According to at least some example embodiments, in the wireless network 100, the ABS pattern may be determined by a core network element (e.g., an MME) or BS within the wireless network 100 and communicated, by that BS, to other BSs within the wireless network 100. For example, in accordance with known methods, the macro cell BS 110A may set an ABS pattern for downlink transmission in the macro cell 120. However, once the ABS pattern is set by the macro cell BS 110A, the ABS pattern needs to be communicated to small cell BSs underlaid with respect to the macro cell BS 110A, like small cell BS 110B. In accordance with eICIC, by communicating the ABS pattern to the small cell BSs, the small cell BSs can configure transmissions to CRE UEs in a manner that corresponds with the ABS pattern being used by the macro cell BS 110A.

One way to communicate an ABS pattern from a macro cell BS to a small cell BS underlaid with respect to the macro cell BS is the use of the known X2 interface which provides a path for communications between eNBs in accordance with LTE standards. Use of the X2 interface to share ABS pattern information is defined, for example, in 3GPP Release 10 standards. However, use of the X2 interface may not be suitable or optimal for all types of HetNet deployment. For example, some reasons why it may not be desirable or possible to share ABS pattern information between BSs over the X2 interface include lack of definition in the current standards. For example, in a situation where ABS information needs to be shared from a macro cell eNB to small cell eNB that happens to be HeNB, the X2 interface is not yet defined by the standards between HeNBs and macro cell eNBs. Further, as another example, rapid or unmonitored deployment of small cells may preclude network provision of X2 interfaces. Additionally, the scaling of many small cells may result in difficulty for the macro cell to deal with the number of stream control transmission protocol (SCTP) links for X2. Further, for some HetNet deployments where ABS information needs to be communicated from a macro cell to a small cell, it is possible that either the small cell or the macro cell does not fully support the X2 interface capabilities needed for the sharing of eICIC ABS information. Additionally, in some situations, even if the X2 interface can be used to some degree to share ABS pattern information between a macro cell and a small cell, the blanking information shared across the X2 interface may be incorrect or outdated. Further, the backhaul is limited and backhaul utilization for transmission of up to date information over X2 may be expensive for the deployment, especially when small frequent packets are encapsulated by internet protocol security (IPSEC).

Figure 1C:
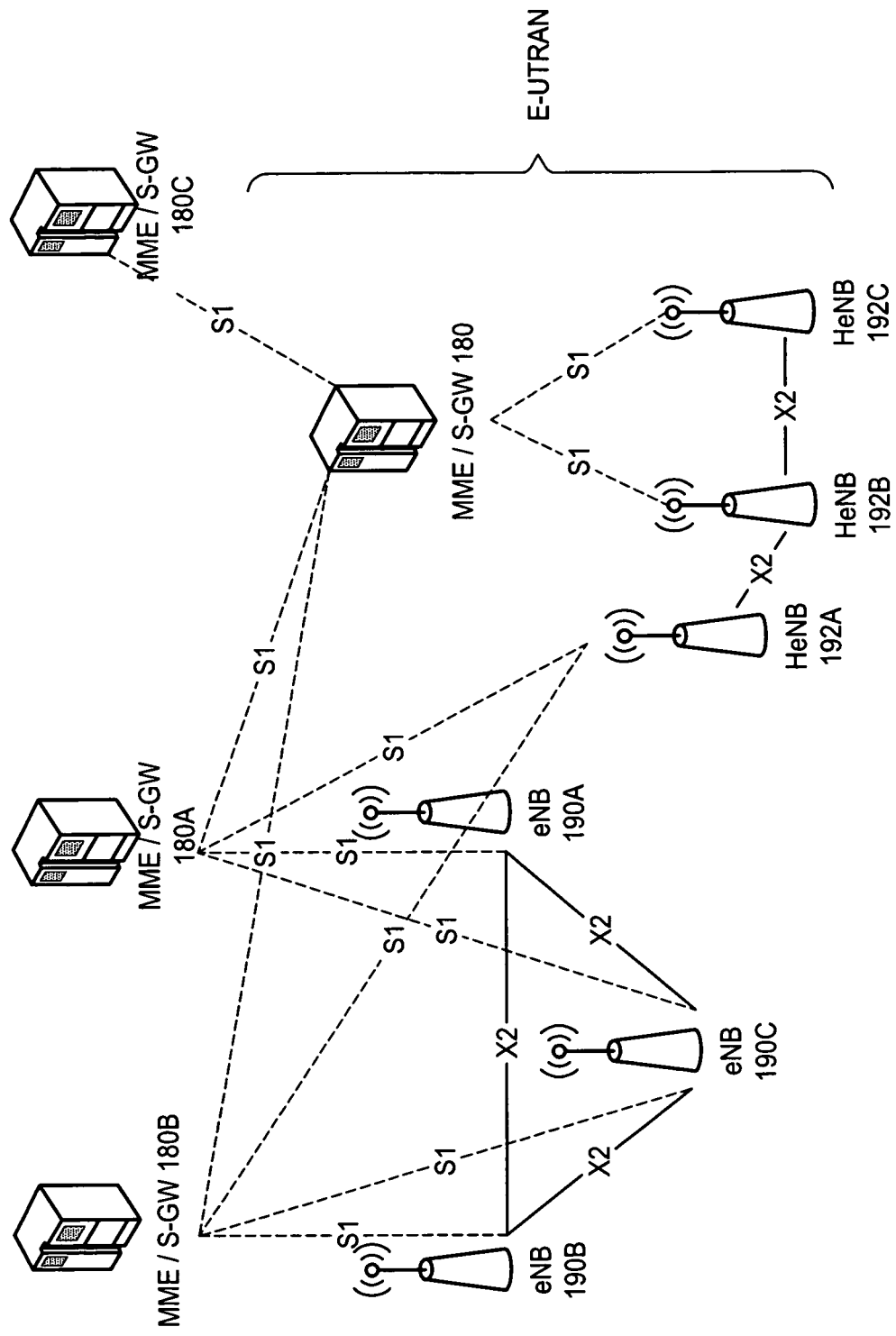
FIG. 1C illustrates an example of a heterogeneous network (HetNet) arrangement for which use of the X2 interface to share data between macro and small cells may be undesirable or impossible.

FIG. 1C illustrates an example of a HetNet arrangement for which use of the X2 interface to share data between macro and small cells may be undesirable or impossible. FIG. 1C illustrates a portion of a HetNet 200. HetNet 200 includes first through third mobility management entity/serving gateways (MME/S-GW)s 180A-180C; first through third macro cell eNBs 190A-190B; HeNB gate way (HeNB GW) 182; and first through third HeNBs 192A-192C. According to at least some example embodiments, HetNet 200 represents an extended view of wireless network 100 illustrated in FIGS. 1A and 1B. For example, first eNB 190A of HetNet 200 may represent macro cell BS 110A of wireless communications network 100; and first HeNB 192A of HetNet 200 may represent small cell BS 110B of wireless communications network 100. Accordingly, first HeNB 192A may be underlaid with respect to first eNB 190A.

First MME/S-GW 180A is communicatively connected to each of first eNB 190A, third eNB 190C and first HeNB 192A through respective S1 interfaces, which are known interfaces defined by LTE standards. Second MME/S-GW 180B is communicatively connected to each of second eNB 190B, third eNB 190C and first HeNB 192A through respective S1 interfaces. Third MME/8S-GW 180C is communicatively connected to HeNB GW 182 through an S5 interface, which is a known interface defined by LTE standards. Third MME/S-GW 180C is also communicatively connected to third HeNB 192C through an S1 interface. HeNB GW 182 is communicatively connected to second and third HeNBs 192B and 192C through respective S1 interfaces. Further, first though third HeNBs 190A-190C are communicatively connected to each other through corresponding X2 interfaces. Additionally, second HeNB 192B is communicatively connected to both first HeNB 192A and third HeNB 192C through respective X2 interfaces.

As is illustrated in FIG. 1C, no X2 interface exists between first eNB 190A (i.e., macro cell BS 110A) and first HeNB 192A (i.e., small cell BS 110B). Consequently, HetNet 200 illustrates an example where, despite being underlaid with respect to macro cell BS 110A, no X2 interface exists through which small cell BS 110B can receive ABS information directly from macro cell BS 110A. Accordingly, in the scenario illustrated by HetNet 200, in order to properly schedule transmissions CRE UEs, small cell BS 110B must obtain information indicating the ABS pattern being used by macro cell BS 110A without using an X2 interface between the macro cell BS 110A and the small cell BS 110B.

Methods for obtaining ABS pattern information using network listening in accordance with example embodiments will now be discussed in greater detail below.

Overview of Methods and Apparatuses for Obtaining ABS Patterns Using Network Listening As is discussed above, the X2 interface may not always be a suitable path through which ABS pattern information can be provided from a macro cell BS to a small cell BS underlaid with respect to the macro cell BS. As will be discussed in greater detail below with reference to FIGS. 2A-5, according to at least some example embodiments, an underlaid small cell BS is capable of obtaining the ABS pattern of a macro cell BS without using an X2 interface between the small cell BS and the macro cell BS.

Example structures of apparatus for determining ABS patterns in accordance with example embodiments will now be discussed in greater detail below with reference to FIGS. 2A-2B.

Figure 2A:
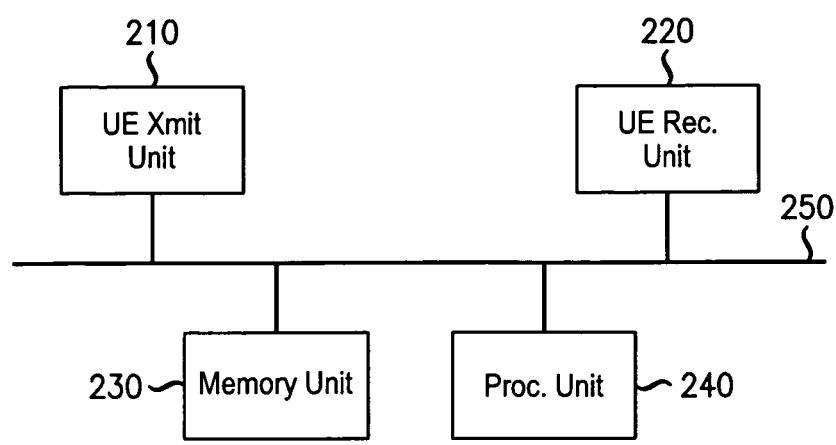
FIG. 2A is a diagram illustrating an example structure of a user equipment (UE).

FIG. 2A is a diagram illustrating an example structure of the UE 201. According to example embodiments, any or all UEs in either of the wireless communications network 100 or HetNet 200, including for example first UE 105A, may have the same structure and operation as UE 201 described below.

The UE 201 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices (e.g., eNBs).

The UE receiving unit 220 is a device that includes hardware and any necessary software for receiving wireless signals on a downlink (forward link) channel including, for example, data signals or control signals, via one or more wireless connections to other wireless devices (e.g., eNBs).

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code including, for example code stored in the memory unit 230. For example, according to at least some example embodiments, the processing unit 240 is capable of analyzing subframes received from a BS in order to estimate which subframes are ABS subframes and which subframes are not.

According to at least some example embodiments, operations described herein as being performed by a UE may be performed by a device having the structure illustrated for UE 201 in FIG. 2A. For example, the memory unit 230 may store executable instructions corresponding to each of the operations described with reference to FIGS. 3-5 as being performed by a UE. Further, the processing unit 240 may be configured perform each of the operations described with reference to FIGS. 3-5 as being performed by a UE, for example, by executing executable instructions stored in the memory unit 230. Further, any UE in the communications network 100 or HetNet 200 may have the structure and/or operation of the UE 201.

FIG. 2B is a diagram illustrating an example structure of the BS 251. According to example embodiments, any or all BSs in either of the wireless communications network 100 or HetNet 200, including for example macro cell BS 110A, small cell BS 110B first eNB 190A, and first HeNB 192A, may have the same structure and operation described below with respect to BS 251.

Referring to FIG. 2B, the BS 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network elements in communications network 105.

The receiving unit 254 is a device that includes hardware and any necessary software for receiving wireless signals including, for example, control signals or data signals via one or more wired and/or wireless connections to other network elements in the communications network 105.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code including, for example code stored in the memory unit 256. For example, the processing unit 258 is capable of implementing a sniffing function which allows the BS 251 to receive data broadcasted by one or more other BSs, for example, by synchronizing with the one or more other BSs in the same known manner as a UE. Further, the processing unit 258 is capable of analyzing subframes received from another BS in order to estimate which subframes are ABS subframes and which subframes are not.

According to at least some example embodiments, operations described herein as being performed by a BS may be performed by a device having the structure of BS 251 illustrated in FIG. 2B. For example, the memory unit 256 may store executable instructions corresponding to each of the operations described with reference to FIGS. 3-5 as being performed by a BS. Further, the processing unit 258 may be configured perform each of the operations described with reference to FIGS. 3-5 as being performed by a BS, for example, by executing executable instructions stored in the memory unit 256. Further, any BS in the communications network 100 or HetNet 200 may have the structure and/or operation of the BS 251.

Methods for obtaining ABS pattern information using network listening using UEs and/or BSs, for example those having the structures discussed above with respect to FIGS. 2A and 2B, will be discussed in greater detail below with reference to FIGS. 3-5.

Example Methods for Determining ABS Pattern Information Using Network Listening

Figure 3:
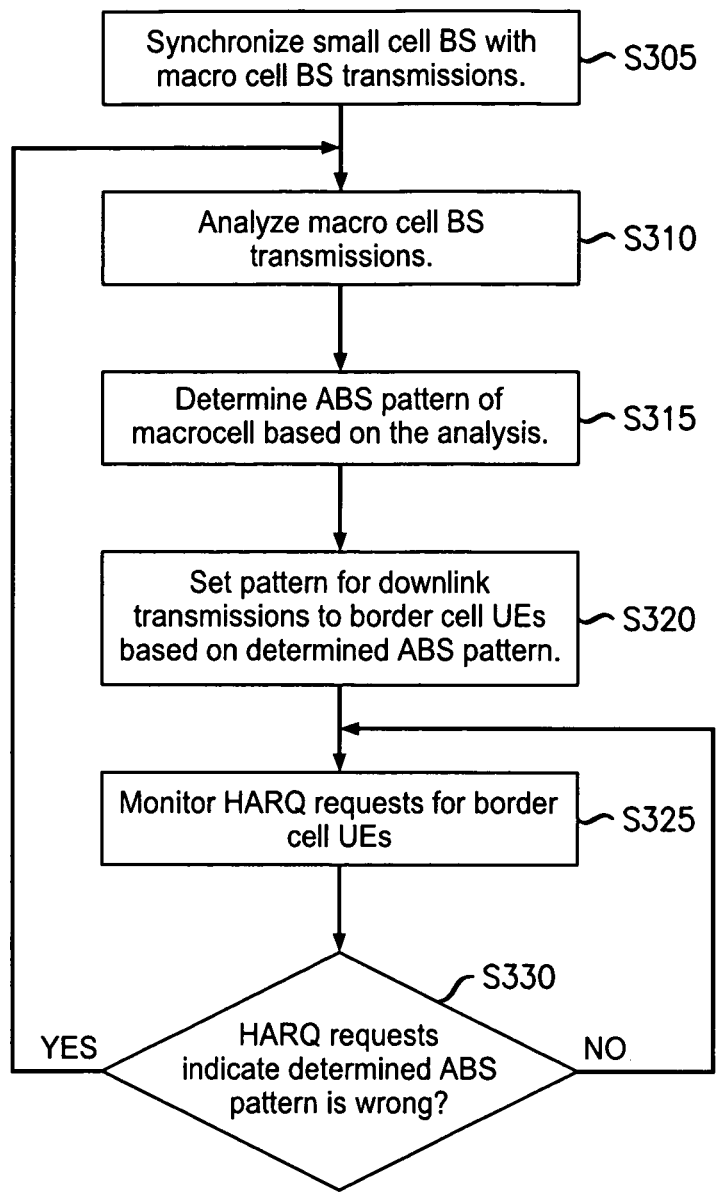
FIG. 3 is a flow chart illustrating an example method of determining almost blank subframe (ABS) pattern information using network listening at a small cell BS.

FIG. 3 is a flow chart illustrating an example method of determining ABS pattern information using network listening at a small cell BS. As will be discussed in greater detail below with respect to FIG. 3, according to at least some example embodiments, a small cell BS underlaid with respect to a macro cell BS in wireless network 100 is capable of detecting or listening to transmissions broadcast by the macro cell. The small cell BS can then analyze the transmissions of the macro cell BS to estimate or determine an ABS pattern being used by the macro cell. The small cell BS can then configure downlink transmissions to CRE UEs attached to the small cell BS in accordance with the ABS pattern.

According to at least some example embodiments, a macro cell BS within wireless network 100 is capable of broadcasting blanking information indicating an ABS pattern of the macro cell in an information block on the broadcast channel. According to at least some example embodiments, the broadcast information block including the blanking information may be received by a small cell BS underlaid with respect to the macro cell BS.

According to at least some example embodiments, macro eNB ABS pattern information obtained by a small cell BS within wireless network 100 may be shared with other small cell BSs which typically share a common macro coverage in wireless network 100 through, for example, X2 interfaces between the small cell BSs.

FIG. 3 will now be explained with reference to FIGS. 1A-1C from the perspective of small cell BS 110B which, as is discussed above with reference to FIG. 1A, is underlaid with respect to macro cell BS 110A.

Referring to FIG. 3, in step S305, the small cell BS 110B may synchronize with transmissions of the macro cell BS 110A. For example, the small cell BS 110B may implement a sniffing function capable of performing the same type of synchronization process performed by a UE. For example, in accordance with known methods, the sniffing function may be capable of tuning to receive the transmissions of the macro eNB base station, detecting primary and secondary synchronization signals (PSS and SSS) broadcasted by the macro cell BS 110A in order to perform timing synchronization so the small cell BS 110B can perform correct symbol detection with respect to the subframes being transmitted by the macro cell BS 110A in accordance with LTE standards. According to at least some example embodiments, once synchronization is complete, the small cell BS 110B receives, or listens to, data being broadcasted by the macro cell BS 110A because the sniffing function allows the small cell BS 110B to properly detect the information being broadcasted by the macro cell BS 110A, for example, in the same known manner as a UE camping on macro cell 120.

In step S310, the small cell BS 110B analyzes the transmissions of the macro cell BS.

According to at least some example embodiments, the small cell BS 110B uses the sniffing function to listen to the transmissions of the macro cell BS 110A to determine a difference in between the manner in which the macro cell BS uses different subframes. The BS 110A can determine the relative usage between different subframes transmitted by the macro cell BS, for example, by determining, for each subframe, the energy of each physical resource block (PRB) as a ratio of the reference signals in accordance with known methods. As will be discussed in greater detail below with reference to FIGS. 3 and 5, the reference signals may be, for example, the cell-specific reference signals (CRS).

In addition, or as an alternative, to monitoring relative usage of different subframes to estimate an ABS pattern being used by the macro cell BS 110A, the small cell BS 110A may receive blanking information indicating the ABS pattern of the macro cell BS 110A in an information block broadcast by the macro cell BS 110A. For example, the macro cell BS 110A may insert the blanking information into a system information block (SIB) which is regularly broadcast by eNBs in accordance with LTE standards. Accordingly, after synchronization in step S305, in step S310 the small cell BS 110B can use the sniffing function to receive the broadcast information block including the blanking information indicating the ABS pattern of then macro cell BS 110A.

In step S315, the small cell BS 110B determines the ABS pattern of the macro cell BS 110A based on the analysis performed in step S310.

For example, in a scenario where the sniffing function of the small cell BS 110B is used to determine relative usage of different subframes by the macro cell BS 110A, by observing which subframes the macro cell BS 110A uses more and which subframes the macro cell BS 110A uses less or not at all, in step S315 the small cell BS 110A can estimate the ABS pattern being used by the macro cell BS by interpreting the subframes which are used less or not at all as subframes being blanked by the macro cell BS 110A. For example, once the small cell BS 110B determines, for each subframe, the energy of each physical resource block (PRB) as a ratio of reference signals broadcasted by the macro cell BS 110A, the small cell BS 110B can then compare the energies calculated for each of the subframes to estimate which subframes are being used for transmission by the macro cell BS 110A and which subframes are being blanked by the macro cell BS 110A.

For example, the sniffing function of the small cell BS 110A may measure received power levels of the reference signals within PRBs (reference signal PRBs) of a subframe broadcasted by the macro cell BS 110A, measure received power levels of other PRBs (non-reference signal PRBs) of the broadcasted subframe, and compare the measured powers. Whenever the measured power of non-reference signal PRBs of a subframe is lower than the measured power of the reference signal PRBs of a subframe (e.g., lower by a threshold value set in accordance with the preferences of an operator of the communications network 100), the sniffing function can determine that subframe is being blanked. Otherwise, if the measured power of the non-reference signal PRBs of a subframe is not lower than the measured power of the reference signal PRBs of a subframe (e.g., by the threshold value), the sniffing function can determine the subframe is being used for data transmission, and thus, not being blanked.

Further, it is possible that an individual subframe could be blank due to a lack of user traffic for the macro cell BS 110A to schedule, and not due the subframe being blanked as part of an ABS pattern of the macro cell BS 110A. Consequently, according to at least one example embodiment, the sniffing function of the small cell BS 110B may receive and analyze a series of subframes over time before making a determination regarding an ABS pattern being used by the macro cell BS 110A. For example, the sniffing function may wait until it detects a repeating sequence of subframes in which the same one or more subframes in each repeated sequence are blanked before determining that the consistently blanked subframes are being blanked as a result of the ABS pattern being used by the macro cell BS 110A. The small cell BS 110B may then determine the ABS pattern of the macro cell BS 110A based on the consistently blanked subframes. Consequently, for the purposes of determining the ABS pattern of the macro cell 110A, subframes which are blanked sporadically and not as part of a repeating sequence can be ignored by the small cell BS 110B as not being indicative of an ABS pattern of the macro cell BS 110A.

The reference signals broadcasted by the macro cell BS 110A and used by the sniffing function of the small cell BS 110B may be, for example, CRS signals which are discussed in, for example, 3GPP TS 36.211 (section 6.10.1).

Further, in a scenario where the macro cell BS 110A broadcasts blanking information in an information block, in step S315 the small cell BS can obtain the information indicating the ABS pattern of the macro cell from the broadcast information block.

In step S320, the small cell BS 110B sets a pattern for downlink transmissions to UEs attached to the small cell BS 110B which are designated as CRE UEs. For example, in step S320, the small cell BS 110B may transmit data to UEs designated as CRE UEs in the subframes designated by the macro cell BS 110A as ABS subframes in the same manner discussed above with reference to FIG. 1B.

According to at least some example embodiments, the example method for determining ABS pattern information using network listening at a small cell BS may end at step S320.

Alternatively, in steps S325 and S330 the small cell BS 110B may monitor transmission characteristics of UEs attached to the small cell BS 110B to determine whether or not the BS pattern determined in step S315 is correct.

For example, in step S325, the small cell BS 110B may monitor transmissions of CRE UEs attached to the small cell BS 110B for retransmission requests. For example, the small cell BS 110B may monitor the CRE UEs attached to the small cell BS 110B for hybrid automatic repeat request (HARQ) retransmission requests.

In step S330, the small cell BS 110B may determine whether or not the monitored retransmission requests indicate that the ABS pattern detected in step S315 is in correct.

For example, an increase in retransmission requests received at the small cell BS 110B from CRE UEs of the small cell BS 110B may indicate an increase in interference being experienced by the CRE UEs since interference prevents transmissions from being successfully received by CRE UEs. For example, as is discussed above with reference to FIGS. 1A-1C, one purpose of eICIC is to improve the quality of downlink transmissions from small cells to UEs attached to the small cells by reducing the amount of interference caused by downlink transmissions from the macro cell during subframes designated as ABS subframes by the macro cell.

Accordingly, the small cell BS 110B can determine whether or not at least one of a volume and a pattern of retransmission requests received from CRE UEs indicates that the small cell BS 110B is sending data to the CRE UEs on subframes other than the ABS subframes actually being used by the macro cell BS 110A.

For example, in step S330, the small cell BS 110B may compare the volume of HARQ retransmission requests received over a given amount of time to a threshold value. The threshold value can be set, for example, in accordance with the preferences of an operator of the wireless communications network 100. If the threshold is exceeded, the small cell BS 110B may determine that the ABS pattern currently being used by the small cell BS 110B is incorrect. Otherwise, if the threshold is not exceeded, the small cell BS 110B may determine that the ABS pattern currently being used by the small cell BS 110B is correct.

As another example, the small cell BS 110B may analyze a change in the volume of HARQ retransmission requests received from the CRE UEs from subframe to subframe to determine whether or not the change in volume of the HARQ retransmission requests exhibits a periodicity. The periodicity may indicate a mismatch between the ABS pattern actually being used by the macro cell BS 110A and the ABS being used by the small cell BS 110B.

In step S330, if the small cell BS 110B determines that the ABS pattern currently being used by the small cell BS 110B is incorrect, the small cell BS 110B may return to step S310 in order to repeat the process of analyzing the transmission of the macro cell BS 110A and determining or estimating the ABS pattern being used by the macro cell BS 110A in step S315. In accordance with at least some example embodiments, if the small cell BS 110A is no longer synchronized with the transmissions of the macro cell BS 110A, instead of returning to step S310 first, the small cell BS 110A may return to step S305 to resynchronize with the transmissions of the macro cell BS 110A before continuing to step S310.

In step S330, if the small cell BS 110B determines that the ABS pattern currently being used by the small cell BS 110B is correct, the small cell BS 110B may return to step S325 in order to repeat the process monitoring the retransmissions requests of the CRE UEs.

As is discussed above, FIG. 3 illustrates an example methods whereby the small cell BS 110B may obtain information indicating an ABS pattern of the macro cell BS 110A by listening to data being broadcasted by the macro cell BS 110A. FIGS. 4 and 5 illustrate example methods whereby the small cell 110B may obtain ABS pattern information from one or more UEs.

As will be discussed in greater detail below with respect to FIGS. 4 and 5, according to at least some example embodiments, a UE attached to a macro cell BS can analyze transmissions of the macro cell BS to estimate or determine an ABS pattern being used by the macro cell, and store the corresponding ABS information indicating the ABS pattern. Once the UE is handed over from the macro cell BS to a small cell BS underlaid with respect to the macro cell BS, the UE can send the stored ABS information to the small cell BS. The small cell BS can then set the pattern of the downlink transmissions to CRE UEs in accordance with the ABS pattern indicated by the ABS information provided by the UE.

Figure 4:
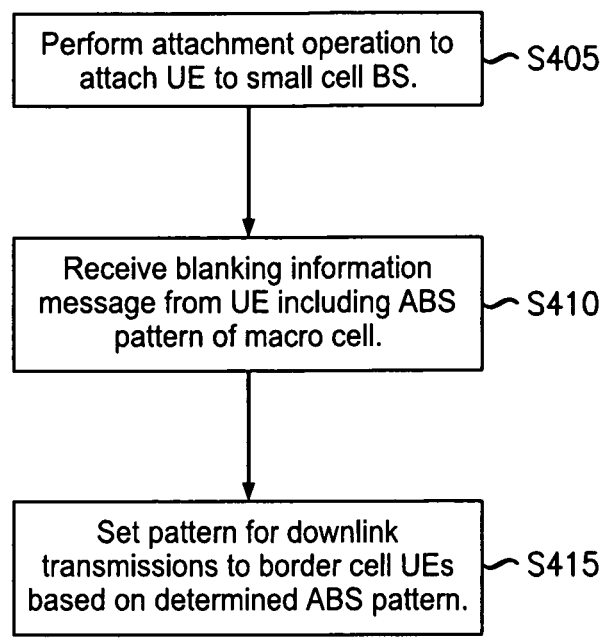
FIG. 4 is a flow chart illustrating an example method of obtaining ABS pattern information of a macro cell at a small cell BS from a UE previously attached to the macro cell.

FIG. 4 is a flow chart illustrating an example method of determining ABS pattern information of a macro cell at a small cell BS based on a message received at the small cell BS from a UE previously attached to the macro cell. FIG. 5 is a flow chart illustrating an example method of obtaining and storing ABS pattern information of a macro cell at a UE in order to provide the ABS pattern information to a small cell BS. FIGS. 4 and 5 will now be explained with reference to FIGS. 1A-1B with respect to a scenario where first UE 105A is initially attached to the macro cell 120 before becoming attached to the small cell 125. FIG. 4 will be explained from the perspective of the small cell BS 110B and FIG. 5 will be explained from the perspective of the first UE 105A.

FIG. 4 will now be explained with reference to FIGS. 1A-1C from the perspective of the small cell BS 110B, which is underlaid with respect to macro cell BS 110A, in a scenario where the first UE 105A is initially attached to the macro cell 120 before becoming attached to the small cell 125.

Referring to FIG. 4, in step S405 the small cell BS 110B performs an attachment operation with the first UE 105A. For example, in accordance with known methods, in step S405 the small cell BS 110B performs the operations necessary to participate in a hand-off operation where the first UE 105A switches from being attached to the macro cell 120 to being attached to the small cell 125.

In step S410, the small cell 110B receives blanking information from the first UE 105A. For example, as will be discussed in greater detail below with reference to FIG. 5, according to at least some example embodiments, the first UE 105A is capable of listening to transmissions of the macro cell BS 110A while the first UE 105A is still attached to the macro cell 120. Further, as will be discussed in greater detail below with reference to FIG. 5, the first UE 105A is also capable of obtaining blanking information indicating an ABS pattern of the macro cell BS 110A based on listening to the transmissions of the macro cell BS 110A. In step S410, the small cell BS 110B receives the blanking information obtained by the UE 105A and determines the ABS pattern of the macro cell BS 110A based on the received blanking information.

In step S415, the small cell BS 110B sets a pattern for downlink transmissions to CRE UEs attached to small cell BS 110B based on the ABS pattern indicated by the blanking information received in step S410.

For example, in the same manner discussed above with reference to step S320 in FIG. 3, in step S415, the small cell BS 110B sets a pattern for downlink transmissions to UEs attached to the small cell BS 110B which are designated as CRE UEs. For example, in step S415, the small cell BS 110B may transmit data to UEs designated as CRE UEs in the subframes designated by the macro cell BS 110A as ABS subframes in the same manner discussed above with reference to FIG. 1B.

Though steps S410 and S415 are discussed above with reference to an example where the small cell BS 110B receives ABS information from the first UE 105A, according to at least some example embodiments, in step S410, the small cell BS 110B may receive ABS information from a plurality of UEs attached to the small cell BS 110B, and the ABS information received from different UEs may indicate more than one ABS pattern of the macro cell BS 110A. Further, in step S415, the small cell BS 110B may determine which of the different ABS patterns to use by determining, for each of the different ABS patterns indicated, a total number of UEs associated with the ABS pattern. In step S415, the small cell BS 110B may choose the ABS pattern associated with the highest number of UEs as the ABS pattern to use in setting the pattern for downlink transmissions to CRE UEs of the small cell BS 110B. Further, according to at least some example embodiments, when determining which ABS pattern to use, the small cell BS 110B may use only the ABS patterns indicated by ABS information received from UEs within a sliding window of a set amount of time, for example 1, 2 or 5 minutes. Accordingly, older ABS information may be excluded from consideration, thereby increasing the accuracy with which the small cell BS 110B determines which pattern is currently being used by the macro cell BA 110A.

The operations of the first UE 105A will now be discussed in greater detail below with reference to FIG. 5.

Figure 5:
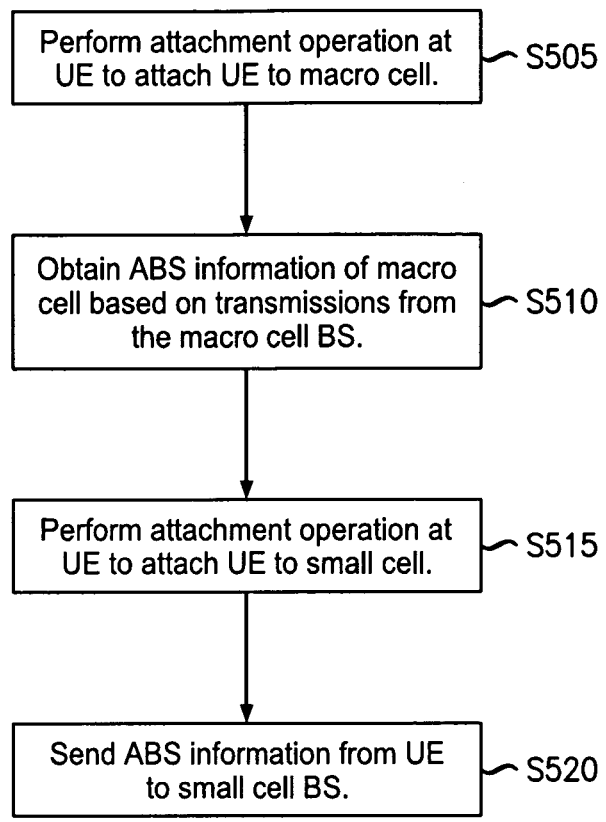
FIG. 5 is a flow chart illustrating an example method of obtaining and storing ABS pattern information of a macro cell at a UE in order to provide the ABS pattern information to a small cell BS.

Referring to FIG. 5, in step S505 the first UE 105A performs an attachment operation to attach to the macro cell 120. The first UE may attach to the macro cell 120 in accordance with known methods. Accordingly, attaching to macro cell 120 may include synchronizing with the transmissions of macro cell BS 110A. For example, in accordance with known methods, first UE 105A may detect primary and secondary synchronization signals (PSS and SSS) in order to perform timing synchronization in order to allow the small cell BS 110B to perform correct symbol detection with respect to the subframes being transmitted by the macro cell BS 110A in accordance with LTE standards.

In step S510, the first UE 105A obtains ABS information of a macro cell based on transmissions from the macro cell BS 110A.

According to at least some example embodiments, the first UE 105A may analyze transmissions of the macro cell BS 110A to obtain the ABS information. For example, in a scenario where the first UE 105A is synchronized with the first macro cell BS 110A, the first UE 105 A detects subframes being transmitted by the macro cell BS 110A. The first UE 105A can determine the relative usage between different subframes transmitted by the macro cell BS 110A, for example, by determining, for each subframe, the energy of each physical resource block (PRB) as a ratio of the reference signals broadcasted by the macro cell 110A.

By observing which subframes the macro cell BS 110A uses more and which subframes the macro cell BS 110A uses less or not at all, in step S315 the first UE 105A can estimate the ABS pattern being used by the macro cell BS by interpreting the subframes which are used less or not at all as subframes being blanked by the macro cell BS 110A. For example, once the first UE 105A determines, for each subframe, the energy of each physical resource block (PRB) as a ratio of the reference signals, the first UE 105A can then compare the energies calculated for each of the subframes to estimate which subframes are being used for transmission by the macro cell BS 110A and which subframes are being blanked by the macro cell BS 110A in order to obtain the blanking information indicating the ABS pattern of the macro cell 110A.

For example, as is discussed above with reference to the small cell BS 110B and FIG. 3, the first UE 105A may measure received power levels of the reference signals within PRBs (reference signal PRBs) of a subframe broadcasted by the macro cell BS 110A, measure received power levels of other PRBs (non-reference signal PRBs) of the broadcasted subframe, and compare the measured powers. Whenever the measured power of non-reference signal PRBs of a subframe is lower than the measured power of the reference signal PRBs of a subframe (e.g., lower by a threshold value set in accordance with the preferences of an operator of the communications network 100), the first UE 105A determines that the subframe is being blanked. Otherwise, if the measured power of the non-reference signal PRBs of a subframe is not lower than the measured power of the reference signal PRBs of a subframe (e.g., by the threshold value), the he first UE 105A determines the subframe is being used for data transmission, and thus, not being blanked.

Further, as is discussed above with reference to the small cell BS 110B, it is possible that an individual subframe could be blank due to a lack of user traffic for the macro cell BS 110A to schedule, and not due the subframe being intentionally blanked as part of an ABS pattern of the macro cell BS 110A. Consequently, according to at least one example embodiment, the UE 105A may receive and analyze a series of subframes over time before making a determination regarding an ABS pattern being used by the macro cell BS 110A. For example, the sniffing function may wait until it detects a repeating sequence of subframes in which the same one or more subframes in each repeated sequence are blanked before determining that the consistently blanked subframes are being blanked as a result of the ABS pattern being used by the macro cell BS 110A. The UE 105A may then determine the ABS pattern of the macro cell BS 110A based on the consistently blanked subframes. Consequently, for the purposes of determining the ABS pattern of the macro cell 110A, subframes which are blanked sporadically and not as part of a repeating sequence can be ignored by the UE 105A as not being indicative of an ABS pattern of the macro cell BS 110A.

The reference signals broadcasted by the macro cell BS 110A and used by the first UE 105A in step S510 may be, for example, CRS signals which are discussed in, for example, 3GPP TS 36.211 (section 6.10.1).

Accordingly, after attaching to the macro cell 120 in step S505, in step S510 the first UE 105A can obtain the ABS information by analyzing the transmissions of the macro cell BS 110A.

In addition, or as an alternative, to monitoring relative usage of different subframes to estimate an ABS pattern being used by the macro cell BS 110A, the first UE 105A may receive blanking information indicating the ABS pattern of the macro cell BS 110A in an information block broadcast by the macro cell BS 110A. For example, the macro cell BS 110A may insert the blanking information into a system information block (SIB) which is regularly broadcast from eNBs to attached UEs in accordance with LTE standards.

Accordingly, after attaching to the macro cell 120 in step S505, in step S510 the first UE 105A can obtain the ABS information of the macro cell BS 110A by receiving the information block which is broadcast by the macro cell BS 110A and includes the blanking information indicating the ABS pattern of the macro cell BS 110A.

In step S515, the first UE 105A performs an attachment operation to attach to small cell 125. For example, in step S515, the first UE may perform the operations necessary to participate in a hand-off operation between the macro cell BS 110A and small cell BS 110B in accordance with known methods.

After attaching to the small cell BS 110B ins to S515, in step S520, the first UE 105A sends the ABS information obtained in step S515 to the small cell BS 110B. For example, the first UE 105A may include the ABS information indicating a ABS pattern of macro cell 110A in a neighbor blanking report, and send the neighbor blanking report to the small cell BS 110B via existing mechanisms for sending report data from UEs to eNBs including, for example a dedicated RRC messaging procedure or additional information elements included in an existing RRC reconfiguration complete message. Additionally, a new "neighbor blanking report"-type of measurement message could be used in accordance with known methods of sending measurement reports from UEs to BSs.

Accordingly, as is discussed above with reference to step S415 in FIG. 4, after sending the ABS information from the first UE 105A to the small cell BS 110B, the small cell BS 110B can determine an ABS pattern of the macro cell 110A based on the ABS information, and schedule transmissions to CRE UEs in accordance with the determined ABS pattern of the macro cell 110A.

According to at least some example embodiments, once the small cell BS 110A receives the ABS information indicating the ABS pattern of the macro cell 110A, for example using any of the methods discussed above with reference to FIGS. 3-5, the small cell BS 110A can send the ABS information to other small cell BSs, for example, through X2 interfaces between the small cell BSs. The other small cells BSs can then determine the ABS pattern of the macro cell 110A based on the ABS information.

For example, referring again to HetNet 200 in FIG. 1C, once first HeNB 192A obtains ABS information indicating the ABS pattern of first eNB 190A using, for example, any of the methods discussed above with reference to FIGS. 3-5, the first eNB 190A can share the obtained ABS information with the second HeNB 192B via the X2 interface between the first and second HeNBs 192A and 192B. Likewise, second eNB 190B can share the obtained ABS information with the third HeNB 192C via the X2 interface between the second and third HeNBs 192B and 192C.

According to at least some example embodiments, the first HeNB 192A may include the listening function discussed above with reference to FIG. 4, while second and third HeNBs 192B and 192C may not. Accordingly, HeNBs in HetNet 200 may be organized in groups which are interconnected by X2 interfaces where only one or fewer than all of the HeNBs in the groups include the listening function used to obtain ABS information based on transmission of a macro cell in the manner discussed above with reference to FIG. 4. The HeNBs in the group which do not include the listening function can obtain the ABS information from a HeNB in the group which does have the listening function. This functionality may be particularly useful because groups of HeNBs often share a common macro eNB neighbor. Accordingly, neighbor macro eNB ABS information obtained by one HeNB in such a group will be relevant to other HeNBs in the group as well.

Thus, according to the example methods discussed above with reference to FIGS. 3-5, ABS information indicating an ABS pattern being used by a macro cell can be obtained by a small cell BS underlaid with respect to the macro cell BS, even when it is impossible or undesirable to send the ABS information through an X2 interface between the macro cell BS and the small cell BS. Once the ABS information is obtained by the small cell BS, the small cell BS can use the obtained ABS information to set a pattern or transmissions to CRE UEs of the small cell BS in accordance with the ABS pattern of the macro BS in accordance with the eICIC scheme.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of determining almost-blank subframe (ABS) information in a heterogeneous network (HetNet) including a macro cell and one or more small cells underlaid with respect to the macro cell, the method comprising:
    obtaining, at a first base station (BS) of a first one of the one or more small cells, almost-blank subframe (ABS) information of the macro cell based on at least one of transmissions of the macro cell to the BS and transmissions to the first small cell of a UE attached to the first small cell, the obtaining ABS information based on the transmissions of the macro cell including,
    synchronizing the first BS with the transmissions of the macro cell,
    analyzing the transmissions of the macro cell based on the synchronization, and
    obtaining the ABS information based on the analyzing,
    the obtaining information based on the transmissions of the UE including,
    receiving a macro cell information message from at least one of the UE and a second BS of a second one of the one or more small cells, the macro cell information message including the ABS information, and
    wherein the analyzing the transmissions of the macro cell based on the synchronization includes receiving a plurality of subframes from the macrocell,
    estimating which of the plurality of subframes are being used for transmission by the macro cell and which subframes are being blanked by the macro cell by
    determining, for each received subframe, power levels of one or more reference signal physical resource blocks (PRBs) of the subframe and power levels of one or more non-reference signal PRBs of the subframe, and
    determining that a subframe is blanked if the power of the one or more non-reference signal PRBs of the subframe are lower than the reference signal PRBs of the subframe.

2. The method of claim 1, wherein the HetNet follows the long term evolution (LTE) protocol, and the BS is an evolved Node B (eNB).

3. The method of claim 1, wherein
    the analyzing the transmissions of the macro cell based on the synchronization further includes performing a comparison operation based on the power levels of the one or more reference signal PRBs and the power levels of the one or more non-reference signal PRBs determined for each of the subframes, and
    the estimating is based on the comparison operation.

4. The method of claim 1, wherein the reference signal broadcasted by the macro cell are cell-specific reference signals (CRS).

5. A method of handling almost-blank subframe (ABS) information in a heterogeneous network (HetNet) including a macro cell a small cell underlaid with respect to the macro cell, the method comprising:
    obtaining, at a UE attached to the macro cell, almost-blank subframe (ABS) information of the macro cell based on transmissions of the macro cell to the UE, wherein the obtaining ABS information based on the transmissions of the macro cell includes
    synchronizing the UE with the transmissions of the macro cell;
    analyzing the transmissions of the macro cell based on the synchronization,
    obtaining the ABS information based on the analysis, and
    receiving a macro cell information message at the UE from the macro cell, the macro cell information message including the ABS information,
    estimating which of the one or more small cells are being used for transmission by the macro cell and which subframes are being blanked by the macro cell
    determining, for each received subframe, power levels of one or more reference signal physical resource blocks (PRBs) of the subframe and power levels of one or more non-reference signal PRBs of the subframe, and determining that a subframe is blanked if the power of the one or more non-reference signal PRBs of the subframe are lower than the reference signal PRBs of the subframe;

performing, at the UE, an attachment operation to attach the UE to the small cell; and sending the ABS information from the UE to a BS of the small cell.

6. The method of claim 5, wherein the HetNet follows the long term evolution (LTE) protocol and the small cell BS is an eNB.

7. A first base station (BS) comprising:

a processor configured to control operations for determining almost-blank subframe (ABS) information in a heterogeneous network (HetNet) including a macro cell and one or more small cells underlaid with respect to the macro cell, the first BS being a BS of a first one of the one or more small cells, the operations including, obtaining, at the first base station (BS), almost-blank subframe (ABS) information of the macro cell based on at least one of transmissions of the macro cell to the BS and transmissions to the first small cell of a UE attached to the first small cell, the obtaining ABS information based on the transmissions of the macro cell including, synchronizing the first BS with the transmissions of the macro cell, analyzing the transmissions of the macro cell based on the synchronization, and obtaining the ABS information based on the analysis, the obtaining information based on the transmissions of the UE including, receiving a macro cell information message from at least one of the UE and a second BS of a second one of the one or more small cells, the macro cell information message including the ABS information wherein the analyzing the transmissions of the macro cell based on the synchronization includes receiving a plurality of subframes from the macro cell, and estimating which of the plurality of subframes are being used for transmission by the macro cell and which subframes are being blanked by the macro cell, and determining, for each received subframe, power levels of one or more reference signal physical resource blocks (PRBs) of the subframe and power levels of one or more non-reference signal PRBs of the subframe, and determining that a subframe is blanked if the power of the one or more non-reference signal PRBs of the subframe are lower than the reference signal PRBs of the subframe.

8. The first BS of claim 7, wherein the HetNet follows the long term evolution (LTE) protocol, and the BS is an evolved Node B (eNB).

9. The first BS of claim 7, wherein the processor is further configured to control the operations, wherein the analyzing the transmissions of the macro cell based on the synchronization further includes performing a comparison operation based on the power levels of the one or more reference signal PRBs and the power levels of the one or more non-reference signal PRBs determined for each of the subframes, and the estimating is based on the comparison operation.

10. The first BS of claim 7, wherein the reference signals broadcasted by the macro cell are cell-specific reference signals (CRS).

11. A user equipment (UE) comprising:

a processor configured to control operations for handling almost-blank subframe (ABS) information in a heterogeneous network (HetNet) including a macro cell a small cell underlaid with respect to the macro cell, the operations including, obtaining, at the UE while the UE is attached to the macro cell, almost-blank subframe (ABS) information of the macro cell based on transmissions of the macro cell to the UE, wherein the obtaining ABS information based on the transmissions of the macro cell includes, synchronizing the UE with the transmissions of the macro cell;

analyzing the transmissions of the macro cell based on the synchronization, obtaining the ABS information based on the analysis, and receiving a macro cell information message at the UE from the macro cell, the macro cell information message including the ABS information, estimating which of the one or more small cells are being used for transmission by the macro cell and which subframes are being blanked by the macro cell determining, for each received subframe, power levels of one or more reference signal physical resource blocks (PRBs) of the subframe and power levels of one or more non-reference signal PRBs of the subframe, and determining that a subframe is blanked if the power of the one or more non-reference signal PRBs of the subframe are lower than the reference signal PRBs of the subframe, performing, at the UE, an attachment operation to attach the UE to the small cell, and sending the ABS information from the UE to a BS of the small cell.

12. The UE of claim 11, wherein the HetNet follows the long term evolution (LTE) protocol and the small cell BS is an eNB.

* * * * *